Jan. 15, 1946.     E. B. KINCAID     2,392,927
WINDOW GLASS PACKAGE
Filed April 12, 1943     3 Sheets-Sheet 1
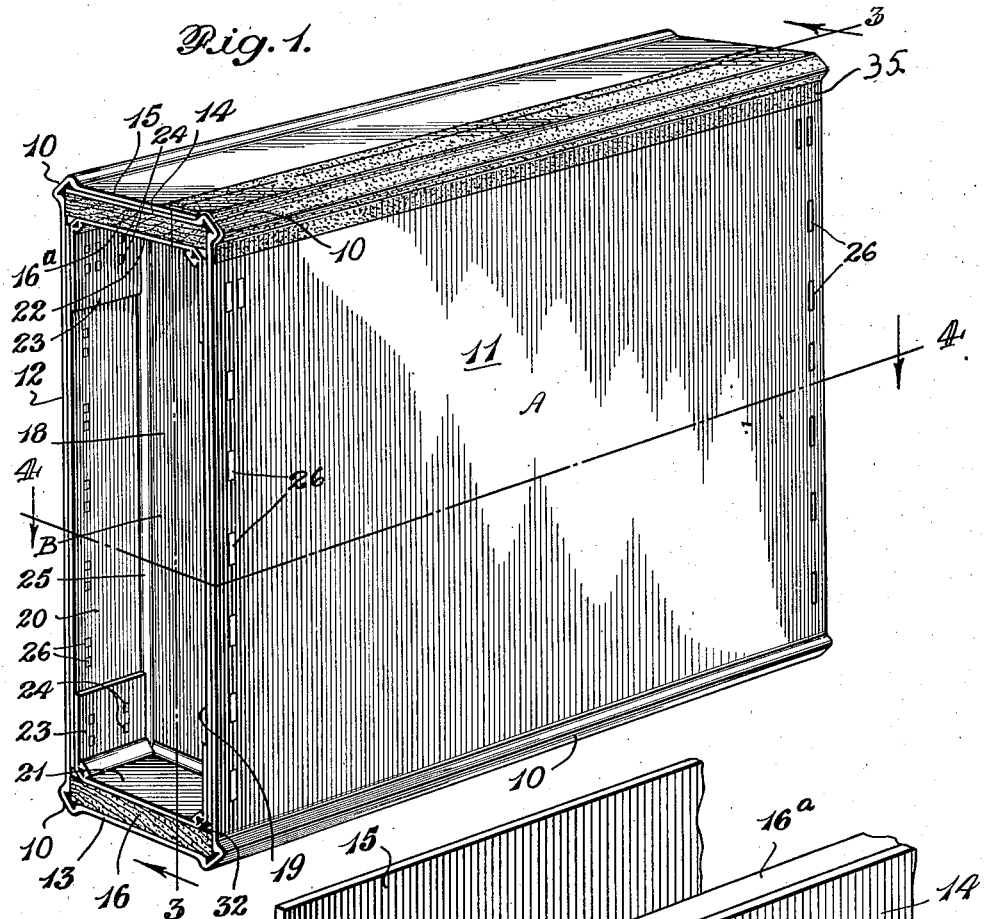
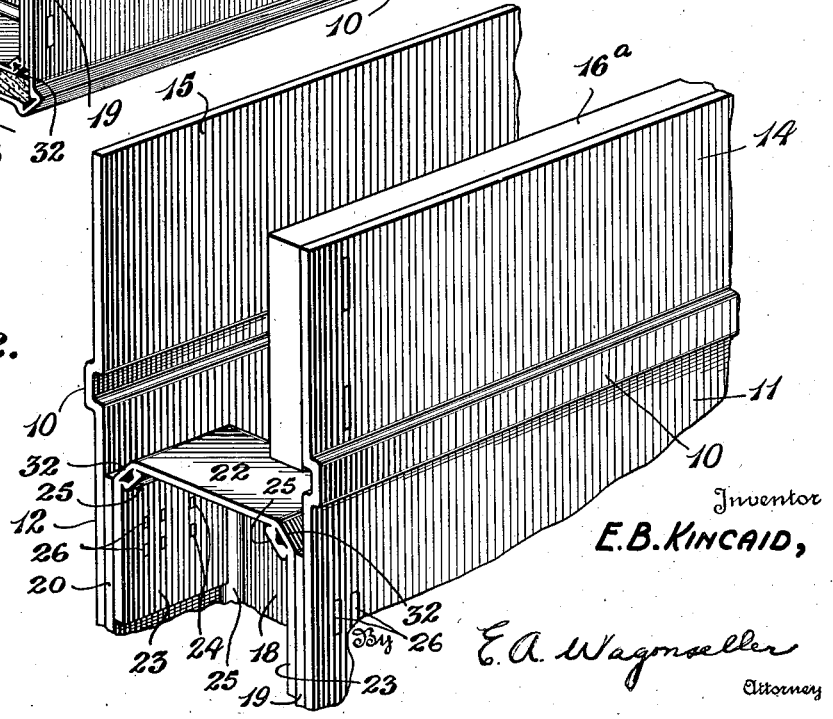
Inventor
E. B. KINCAID, Jan. 15, 1946. E. B. KINCAID 2,392,927
WINDOW GLASS PACKAGE
Filed April 12, 1943 3 Sheets-Sheet 2

Inventor
E. B. KINCAID,
By E. A. Wagonseller
Attorney

Jan. 15, 1946.   E. B. KINCAID   2,392,927
WINDOW GLASS PACKAGE
Filed April 12, 1943   3 Sheets-Sheet 3
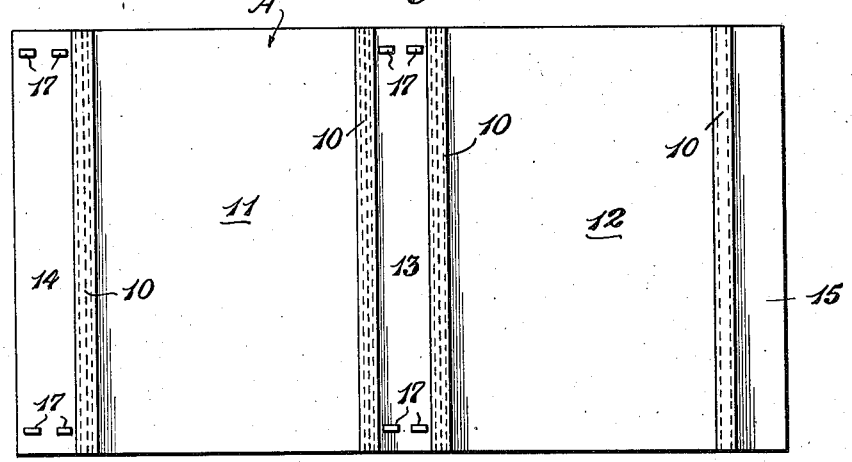
Fig. 5.
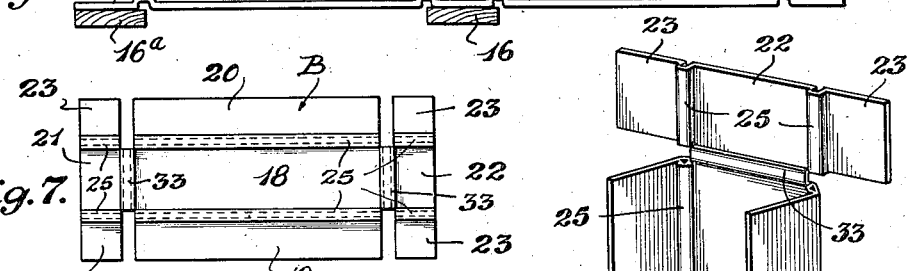
Fig. 6.
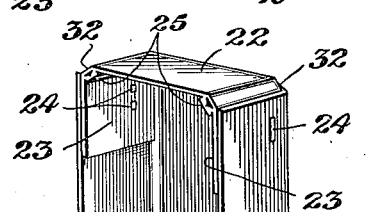
Fig. 7.
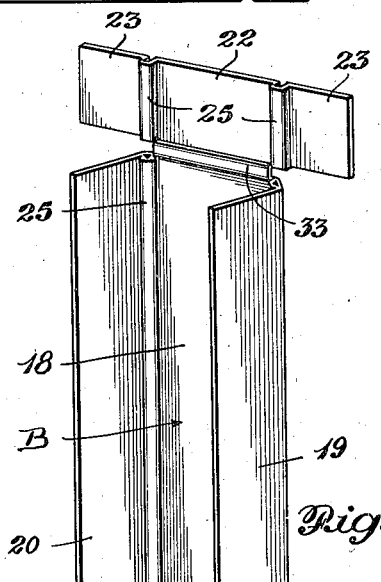
Fig. 8.
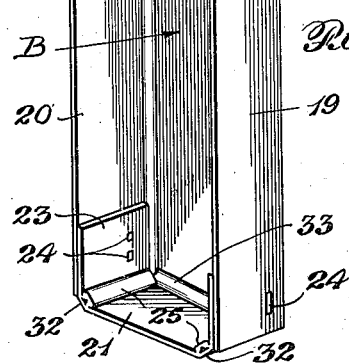
Fig. 9.
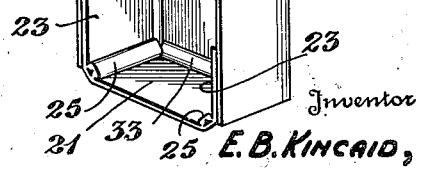
Inventor
E. B. KINCAID,
By E. A. Wagonseller
Attorney Patented Jan. 15, 1946

2,392,927

UNITED STATES PATENT OFFICE 2,392,927

WINDOW GLASS PACKAGE

Elbert Ben Kincaid, Cincinnati, Ohio, assignor to Container Corporation of America, Chicago, Ill., a corporation of Delaware Application April 12, 1943, Serial No. 482,777

5 Claims. (Cl. 206—62)

The invention relates to shipping cartons for sheet material such as window glass and the like, and to packages including such material. Although primarily intended for shipping glass sheets, the carton is also adapted to the packing and shipping of other materials than glass, such as wall board, permacoustic tile and the like.

Broadly speaking, the object of the invention is to provide a strong, inexpensive and efficient packing case for window glass and the like formed principally of strong fiberboard or similar flexible sheet material, instead of being formed principally of wood, as in the case of crates previously employed for the packaging of window glass and the like.

Another object of the invention is to provide a rectangular-sided package which is arranged so that the top, bottom and end portions are spaced and protected from adjacent objects.

A further object of the invention is to provide a carton for packing window glass and the like having recessed or countersunk ends which serve to protect the panes of glass from endwise blows.

A further object of the invention is to provide a packing carton for window glass and the like having the top and bottom provided with suitable reinforcing strips of wood or the like firmly yet resiliently supported so as to prevent injury to the panes of glass while at the same time serving to hold the panes of glass securely in position.

Other objects of the invention will be apparent from a consideration of the accompanying drawings and the following detailed description, in which is set forth by way of illustration a specific embodiment of the inventive thought.

In the drawings—

Fig. 1 is a perspective view of a closed carton embodying my invention.

Fig. 2 is a fragmentary view of one end portion of the same with the closure flaps open prior to the insertion of window glass panes or the like;

Fig. 5 is a plan view of the blank from which the body portion of the carton is to be formed;

Fig. 6 is an end view of the same showing the wooden reinforcing strips;

Fig. 7 is a plan view of the blank from which one of the countersunk ends may be formed;

Fig. 8 is a perspective view showing one of the ends partially set up in tray form, and Fig. 9 is a similar view showing one of the ends completely set up and stapled and ready for assembly with the body blank.

Figure 3:
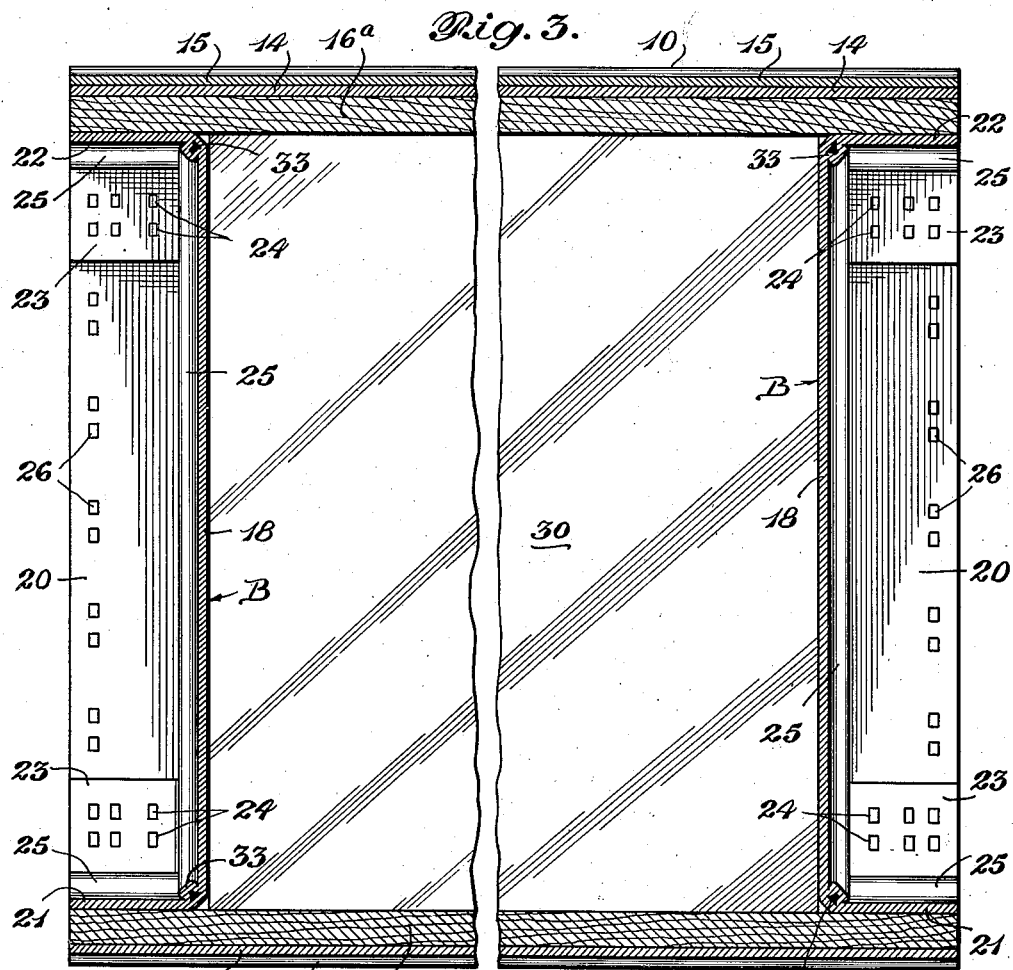
Fig. 3 is a vertical section on line 3—3 of Fig. 1.

The packing container as shown in Fig. 1 comprises a body portion A which may be formed from a blank such as is shown in Figs. 5 and 6, said body portion having integral closure flaps, and when closed being provided with top and bottom reinforcing strips. The carton is also provided with recessed or countersunk end members B formed from separate blanks, one of which is shown in Fig. 7. These countersunk end members provide strong yet resilient supports or struts for the top and bottom of the carton and also serve to hold the contents of the package firmly yet resiliently, thereby preventing breakage.

Referring to Fig. 5 the body blank A may be formed from a rectangular strip of heavy sheet material, preferably solid fiber or the like, although corrugated fiberboard or other materials may be used if desired as long as they are strong enough to withstand jars and protect the contents from injury. In the present example the carton is illustrated as being made of solid fiberboard. The blank is initially creased along parallel score lines 10 so as to provide ribs on the outside and grooves on the inside, and to form rectangular side panels 11 and 12, a narrow rectangular bottom panel 13, and closure flaps 14 and 15. It will be noted that the side panel 11 is slightly narrower than the panel 12 so that the score line 10 separating the closure panel 14 from the side panel 11 is not so far removed from the bottom panel as is the closure flap panel 15. As shown, the bottom panel 13 is provided with a reinforcing strip 16 which may be of wood or like material, and the closure panel 14 is provided with a similar reinforcing strip 16a. While the reinforcing strips are preferably of wood other reinforcing material may be employed if desired, as, for example, solid or corrugated fiberboard or the like. The reinforcing strips 16 and 16a are secured to their respective panels 13 and 14 by any suitable means, as, for example, the staples 17, 17.

The blanks from which the recessed members B of the carton are to be formed may be alike in construction, and the description of the method of forming one of such end members will apply to both. It will be apparent that while a specific form of countersunk end is herein described, the ends may be formed in different ways without departing from the spirit of the invention in its broadest aspects. The blank B is preferably formed of the same material as the blank A, although if desired a different material may be employed. The blank is first die-cut and scored as indicated in the form of the structure shown in Fig. 7. These score lines divide the blank into connected panels, including what may be termed a bottom portion 18 which, in the assembled device, constitutes the end of the carton, the said bottom portion 18 being connected to side panels 19 and 20 and end flaps 21 and 22. Each of the end flaps is provided with ears or extensions 23, 23.

In assembling the end members B into tray form the sides 19 and 20 are folded upwardly along the score lines 25, 25, after which the end flaps 21 and 22 are assembled therewith as indicated in Figs. 8 and 9, with the ears 23 folded inwardly against the ends of the side walls 19 and 20. The end members are then secured in tray form by any suitable means, as by the application of suitable staples 24, which secure the ears 23, 23 to the side walls 19 and 20. It will be noted that in assembling the tray the rib portions of the score lines are at the interior of the tray so that the edges of the tray are inclined or beveled as indicated at 32, thus providing a very strong yet somewhat flexible arch construction which serves to securely support the reinforcing members 16 and 16a when the carton is assembled as indicated in Fig. 1. Thus the members B, in addition to serving as end closures, also serve as supports, struts or the like for the reinforcing strips 16 and 16a. Furthermore, beveled portions 33 are provided at the upper and lower ends of the walls 18, 18 when the countersunk end portions are assembled, as indicated in Fig. 3.

After the end members have been set up and stapled as indicated in Fig. 9 they are ready for assembly with the body blank A. To form the carton the body blank A is folded to U-shape with the closure flaps 14 and 15 open as indicated in Fig. 2. These flaps tend to retain the vertical position owing to the resiliency of the material, and of the hinge portions. It will be noted that in assembling the body blank the rib portions of the score lines 10 are on the outside instead of inside, as in the case of the end members B. The previously set up end members B are then inserted and suitably secured to the ends of the walls 11 and 12 in suitable manner, as, for example, by rows of staples 26, 26. It will also be noted that the lower portions 21 of the end members B are in contact with the reinforcing strip 16 as indicated in Fig. 1.

Figure 4:
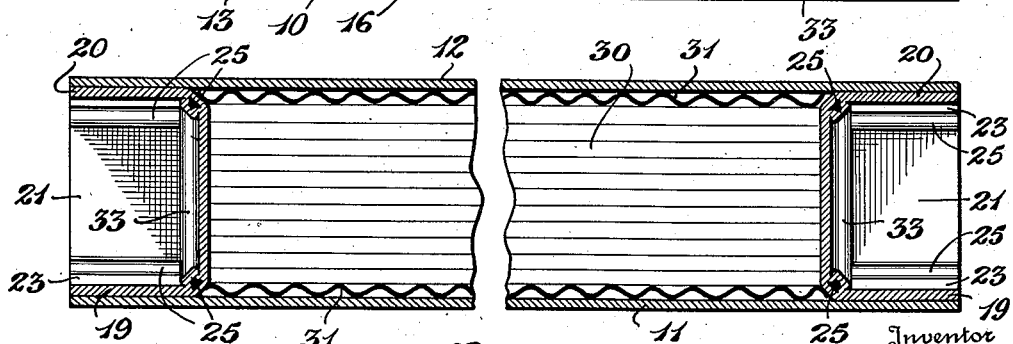
Fig. 4 is a horizontal section on line 4—4 of Fig. 1.

Sheets 30 of glass or other material to be packed and which it is desirable to protect against shock from the sides, top, bottom and ends, may then be assembled through the open top, the closure flaps being in the position indicated in Fig. 2 before the closure flaps have been folded down and secured in the position shown in Fig. 1. If desired one or more sheets 31 of suitable packing material, such as corrugated paperboard or the like, may be inserted between the glass sheets and the outer walls 11 and 12, as shown in Fig. 4, although such packing sheets may be omitted if desired.

When the sheets have been packed, the closure flap 14 with its reinforcing strip 16a is then folded down so that its ends rest upon arch portions 22 of the end members B. The other flap 15 is then folded down over the flap 14 and may be secured thereto by any suitable means, as by means of tape 35, or by any other suitable means, as by stapling, the use of adhesive, or a combination of such securing means.

It will be noted that when the package is closed the ends of the glass sheets 30 firmly contact the upper right portions 18 of the countersunk end members B and are thus protected from blows from the ends. Also, the arch construction of the end members insures strength, and at the same time a certain degree of resilience is provided which prevents breakage of the fragile glass sheets. Furthermore, a certain degree of resilience results from the hinging of the closure flaps to the side walls of the carton. The top and bottom portions of the glass sheets are in contact with the reinforcing strips 16 and 16a, but these strips are prevented from being forced against the glass panes because of the countersunk ends B upon which the reinforcing strips rest. The arrangement provides a firm yet cushioning support for the ends and top and bottom of the glass panes.

It will be apparent from the foregoing that a very compact and inexpensive package is provided, and that the danger of breakage or injury of fragile articles, such as glass sheets or the like, included in the package is reduced to a minimum.

The invention has been described in detail for the purpose of illustration, but it will be obvious that numerous modifications and variations may be resorted to without departing from the spirit of the invention.

I claim:

1. A carton for shipping sheets of glass or the like comprising a U-shaped body member of paperboard material cut and scored to form a relatively narrow bottom panel, a pair of side wall panels hingedly joined to said bottom panel and a top closure flap hingedly joined to each of said side wall panels, a reinforcing strip secured to and covering substantially all of the inner surface of said bottom panel, a pair of recessed end members of paperboard material, each of said end members having an end panel, an upper flange, a lower flange resting upon said reinforcing strip adjacent its end and a pair of lateral flanges secured to the edges of said side wall panels, and a second reinforcing strip secured to one of said closure flaps, said second strip being adapted to be supported adjacent its ends by said upper flanges.

2. A carton in accordance with claim 1 wherein both of said reinforcing strips are of wood and said second reinforcing strip is secured to the inner surface of one of said flaps.

3. A carton in accordance with claim 1 wherein said lower and upper flanges are provided with tabs at their ends secured to said lateral flanges.

4. A carton for shipping sheets of glass or the like, comprising a unitary sheet of paperboard material scored along parallel lines to provide an initially open ended and open topped body portion having U-shaped cross-section and including a bottom panel, a pair of side walls hingedly joined to the bottom panel on opposite sides thereof, and a pair of integral top closure flaps hingedly joined to said side wall panels along the upper edges thereof; separate end members secured to the edge portions of said side wall panels, and completely closing the previously open ends of said U-shaped body member, and reinforcing members secured to said bottom panel and to one of said top closure flaps covering substantially all of the inner surfaces thereof, each of said reinforcing strips having its ends supported by said end members.

5. A carton for shipping sheets of glass and the like comprising an initially open ended U-shaped body member formed from a single sheet of paperboard material scored along a series of parallel lines to form a relatively narrow bottom panel, a pair of side wall panels hingedly joined to the bottom panel along the relatively long edge portions thereof, and a top closure flap hingedly joined to one of said side wall panels; a reinforcing strip secured to and covering substantially all of the inner surface of said bottom panel, a pair of separate unitary end members constituting the sole end closure means for said U-shaped body member, said end members being secured to the edge portions of said side wall panels, and having their lower portions supported by said reinforcing strip, and a second reinforcing strip initially secured to the top closure flap before the flap is closed and adapted to be supported adjacent its ends by said end members when said top flap is in closed position.

ELBERT BEN KINCAID.